US010075287B2

(12) United States Patent
Wang

(10) Patent No.: US 10,075,287 B2
(45) Date of Patent: Sep. 11, 2018

(54) TIME SYNCHRONIZATION METHOD AND DEVICE

(71) Applicant: ZTE CORPORATION, Shenzhen, Guangdong Province (CN)

(72) Inventor: Zhiping Wang, Shenzhen (CN)

(73) Assignee: ZTE Corporation, Shenzhen, Guangdong Province (CN)

(*) Notice: Subject to any disclaimer, the term of this patent is extended or adjusted under 35 U.S.C. 154(b) by 252 days.

(21) Appl. No.: 14/442,108

(22) PCT Filed: Jul. 23, 2013

(86) PCT No.: PCT/CN2013/079848
§ 371 (c)(1),
(2) Date: May 12, 2015

(87) PCT Pub. No.: WO2013/182161
PCT Pub. Date: Dec. 12, 2013

(65) Prior Publication Data
US 2016/0197719 A1 Jul. 7, 2016

(30) Foreign Application Priority Data

Nov. 12, 2012 (CN) .......................... 2012 1 0453947

(51) Int. Cl.
G06F 15/16 (2006.01)
H04L 7/00 (2006.01)
(Continued)

(52) U.S. Cl.
CPC .............. *H04L 7/04* (2013.01); *H04J 3/0641* (2013.01); *H04J 3/0667* (2013.01)

(58) Field of Classification Search
CPC .......... H04L 7/04; H04J 3/0641; H04J 3/0667
(Continued)

(56) References Cited

U.S. PATENT DOCUMENTS 9,516,615 B2*  12/2016  Stacey .............. H04W 56/0015
2001/0030559 A1* 10/2001  Fredriksson ............ H03L 7/087
327/156
(Continued)

FOREIGN PATENT DOCUMENTS

CN     101075900 A    11/2007
CN     101106442 A     1/2008
(Continued)

OTHER PUBLICATIONS

Wiley, John & Sons, Chapter 9: Time Synchronization, Fundamentals of Wireless Sensor Networks: Theory and Practice, Waltenegus Dargle and Christian Poellabauer, 2010.*
(Continued)

*Primary Examiner* — Oscar Louie
*Assistant Examiner* — Antony Clayborn
(74) *Attorney, Agent, or Firm* — Ling Wu; Stephen Yang; Ling and Yang Intellectual Property

(57) ABSTRACT

Disclosed are a time synchronization method and device. The method includes: a slave device detecting whether time synchronization can be performed via a primary link between a master device and the slave device; and when time synchronization cannot be performed via the primary link between the master device and the slave device, the slave device using a backup link to perform time synchronization. By the method and device in the embodiments of the present document, the technical problem of time synchronization failure caused by abnormalities in the related art is solved, and the technical effect of improving the reliability of time synchronization is achieved.

16 Claims, 7 Drawing Sheets

(51) Int. Cl.
*H04L 7/04* (2006.01)
*H04J 3/06* (2006.01)

(58) Field of Classification Search
USPC .......................................................... 709/248
See application file for complete search history.

(56) References Cited

U.S. PATENT DOCUMENTS

| | | | | |
|---|---|---|---|---|
| 2004/0123174 | A1* | 6/2004 | Dhupar | H04J 3/0638 |
| | | | | 713/401 |
| 2008/0010423 | A1* | 1/2008 | Lien | H04Q 11/04 |
| | | | | 711/162 |
| 2008/0120058 | A1* | 5/2008 | Kim | G06F 11/2236 |
| | | | | 702/118 |
| 2009/0228732 | A1* | 9/2009 | Budde | H04B 7/269 |
| | | | | 713/400 |
| 2011/0051752 | A1* | 3/2011 | Tang | H04J 3/0641 |
| | | | | 370/503 |
| 2011/0161524 | A1* | 6/2011 | Na | H04J 3/0667 |
| | | | | 709/248 |
| 2011/0173347 | A1* | 7/2011 | Steiner | H04J 3/0676 |
| | | | | 709/248 |
| 2012/0045199 | A1* | 2/2012 | Sun | H04Q 11/0067 |
| | | | | 398/5 |
| 2012/0102234 | A1* | 4/2012 | Bui | H04J 3/0664 |
| | | | | 709/248 |
| 2012/0159001 | A1* | 6/2012 | Liu | G06F 1/14 |
| | | | | 709/248 |
| 2012/0264371 | A1* | 10/2012 | Kim | H04W 56/0015 |
| | | | | 455/13.2 |
| 2012/0287948 | A1* | 11/2012 | Ruffini | H04J 3/0682 |
| | | | | 370/503 |
| 2014/0269673 | A1* | 9/2014 | Yin | H04J 3/0667 |
| | | | | 370/350 |

FOREIGN PATENT DOCUMENTS

| | | |
|---|---|---|
| CN | 101997665 A | 3/2011 |
| CN | 103001720 A | 3/2013 |
| JP | 2003309887 A | 10/2003 |
| JP | 2012526421 A | 10/2012 |

OTHER PUBLICATIONS

Multi-path Time Synchronization draft-shpiner-multi-path-synchronization; Network Working Group; A. Shpiner et al. Oct. 15, 2012; XP015085235.

IEEE 1588 applied in the environment of high availability LANs; 2007 International IEEE Symposium on Precision Clock Synchronization (ISPCS); for Measurement, Control and Communication; Vienna, Austria, Oct. 1-3, 2007; Sven Meier et al. XP031161286.

Keeping Clock Accuracy on a Master Clock Failure in Substation Network; Yasuyuki Kozakai and Mitsuru Kanda; Japan; XP031780883.

* cited by examiner

TIME SYNCHRONIZATION METHOD AND DEVICE

TECHNICAL FIELD

The present document relates to the field of communications, and particularly, to a time synchronization method and device.

BACKGROUND

IP (Internet Protocol) is the development trend of future network services, and Ethernet has become the main development direction of IP-based bearer network with its excellent cost performance, widespread application and product support.

When deploying a carrier-class Ethernet, time synchronization and clock synchronization of a device is a key performance indicator. In the communication network, different services have different requirements on time synchronization, for example, services such as billing systems, communication network management systems and VII signaling usually require millisecond time synchronization. Wherein, the most stringent requirement comes from mobile network services, and, with the development of mobile technology, mobile network services also have higher and higher requirements on precision and reliability of time synchronization of network.

For implementing transmission of time synchronization signals in the Ethernet, at present a class of relatively mature technologies is the packet-based synchronization technology, for example, the time synchronization technology implemented based on the IEEE 1588 V2 protocol (that is, Precision Time Protocol, referred to as PTP).

The time synchronization technology implemented based on the IEEE 1588 V2 protocol can usually achieve time precision of sub-microsecond and even nanosecond level. As shown in FIG. 1, it is required to send IEEE 1588 V2 protocol packets between the master device and the slave device, and the packets respectively carry time information, and on the slave device side, according to the time information in a group of IEEE 1588 V2 protocol packets, the Time Offset between the slave device and the master device can be calculated out to correct the time of the slave device, so as to achieve time synchronization. FIG. 1(a) is a flow chart of a group of packets based on the E2E (End-to-End) synchronization mechanism in the IEEE 1588 V2 protocol as well as time synchronization; FIG. 1(b) is a flow chart of a group of packets based on the P2P (Peer-to-Peer) synchronization mechanism in the IEEE 1588 V2 protocol as well as time synchronization.

The reliability of time synchronization technology achieved based on the IEEE 1588 V2 protocol is relatively poor, and when a protocol packet loss caused by abnormalities such as an abnormal link or a congestion between the master device and the slave device occurs, it may result in an incomplete sequence in a group of protocol packets, thereby causing time synchronization failure.

For the abovementioned problem, so far no effective solutions have been proposed yet.

SUMMARY

The embodiments of the present document provide a time synchronization method and device to at least solve the technical problem of time synchronization failure caused by abnormalities in the related art.

The embodiments of the present document provide a time synchronization method, comprising:

a slave device detecting whether time synchronization can be performed via a primary link between a master device and the slave device;

when time synchronization cannot be performed via the primary link between the master device and the slave device, the slave device using a backup link to perform time synchronization.

Alternatively, the step of the slave device using a backup link to perform time synchronization comprises:

the slave device switching from the primary link to a backup link between the master device and the slave device, wherein the master device before and after switching is the same device and has a same clock source for the time synchronization;

the slave device using the backup link to perform the time synchronization with the master device.

Alternatively, the step of the slave device switching from the primary link to the backup link between the master device and the slave device comprises:

the slave device switching from the primary link to one said backup link between the master device and the slave device, wherein the slave device establishes one said primary link and at least one said backup link with the master device in advance.

Alternatively, the step of the slave device using a backup link to perform time synchronization comprises:

the slave device switching from the primary link to a backup link between a backup master device and the slave device, wherein the master device and the backup master device are not the same device but have a same clock source used for the time synchronization;

the slave device using the backup link to perform the time synchronization with the backup master device.

Alternatively, before the step of the slave device detecting whether time synchronization can be performed via a primary link between a master device and the slave device, the method further comprises:

the slave device establishing physical connection with the master device and the backup master device simultaneously to respectively obtain the primary link and the backup link.

Alternatively, the step of the slave device switching from the primary link to the backup link between the backup master device and the slave device comprises: the slave device switching from the primary link to the backup link between the slave device and one said backup master device, wherein the slave device establishes one said primary link with the master device in advance, and establishes at least one said backup link with at least one said backup master device.

Alternatively, the step of the slave device using a backup link to perform time synchronization comprises:

the slave device interacting protocol packets with the backup master device to obtain a time offset T2 between the slave device and the backup master device;

the slave device comparing the time offset T2 with the previously obtained time offset T1 between the slave device and the master device;

when the difference $\Delta T = T2 - T1 > k \cdot T1$ ($0 < k \leq 1$), the slave device corrects the time offset T2, wherein the corrected time offset is $T2 = k \cdot T1$.

Alternatively, after the step of the slave device correcting the time offset T2, the method further comprises:

the salve device obtaining a time offset between the slave device and the backup master device at every predetermined time interval, when $\Delta T = Tn - Tn-1 > k \cdot Tn-1$, correcting Tn to Tn=k·Tn−1 (0<k≤1), and when ΔT=Tn−Tn−1≤k·Tn−1 (0<k≤1), stopping correcting the time offset, wherein, Tn indicates a time offset between the slave device and the backup master device that is obtained by the salve device at the nth time, Tn−1 indicates a time offset between the slave device and the backup master device that is obtained by the slave device at the (n−1)th time.

Alternatively, the step of the slave device detecting whether time synchronization can be performed via a primary link between a master device and the slave device comprises:

the slave device judging whether a clock grade of a clock source of the master device can be detected, or judging whether the detected clock source of the master device is a clock source with the highest clock grade in all clock sources in a database;

when the slave device cannot detect the clock grade of the clock source of the master device, or determines that the detected clock source of the master device is not a clock source with the highest clock grade in all clock sources in the database, then the slave device detecting that time synchronization cannot be performed via the primary link between the master device and the slave device;

the step of the slave device using a backup link to perform time synchronization comprises:

the slave device switching from the primary link to a backup link between the slave device and the backup master device corresponding to the clock source with the highest clock grade in the database;

the slave device using the backup link to perform the time synchronization with the backup master device.

The embodiments of the present document further provide a time synchronization device located in a slave device, comprising:

a detection unit, configured to: detect whether time synchronization can be performed via a primary link between a master device and the slave device;

a synchronization unit, configured to: when time synchronization cannot be performed via the primary link between the master device and the slave device, use a backup link to perform time synchronization.

Alternatively, the synchronization unit comprises:

a first switching module, configured to: switch from the primary link to a backup link between the master device and the slave device, wherein, the master device before and after switching is the same device and has a same clock source used for the time synchronization;

a first synchronization module, configured to: use the backup link to perform the time synchronization with the master device.

Alternatively, the first switching module comprises:

a first switching sub-module, configured to: switch from the primary link to one said backup link between the master device and the slave device, wherein the slave device establishes one said primary link and at least one said backup link with the master device in advance.

Alternatively, the synchronization unit further comprises:

a second switching module, configured to: switch from the primary link to a backup link between a backup master device and the slave device, wherein, the master device and the backup master device are different devices but have a same clock source for the time synchronization;

a second synchronization module, configured to: use the backup link to perform the time synchronization with the backup master device.

Alternatively, the device further comprises:

a link establishing unit, configured to: before the detection unit detecting whether time synchronization can be performed via a primary link between the master device and the slave device, establish physical connection with the master device and the backup master device simultaneously to respectively obtain the primary link and the backup link.

Alternatively, the second switching module comprises:

a second switching sub-module, configured to: switch from the primary link to the backup link between the slave device and one said backup master device, wherein the slave device establishes one said primary link with the master device in advance, and establishes at least one said backup link with at least one said backup master device.

Alternatively, the synchronization unit further comprises:

an obtaining module, configured to: interact protocol packets with the backup master device to obtain a time offset T2 between the slave device and the backup master device;

a comparing module, configured to: compare the time offset T2 with the previously obtained time offset T1 between the slave device and the backup master device; and a correcting module, configured to: when the difference ΔT=T2−T1>k·T1 (0<k≤1), correct the time offset T2, wherein, the corrected time offset is T2=k·T1.

Alternatively, the correcting module is further configured to: after correcting the time offset T2, obtain a time offset between the slave device and the backup master device at every predetermined time interval, when ΔT=Tn−Tn−1>k·Tn−1, correct Tn to Tn=k·Tn−1 (0<k≤1), when ΔT=Tn−Tn−1≤k·Tn−1, stop correcting the time offset, wherein, Tn indicates a time offset between the slave device and the backup master device that is obtained by the slave device at the nth time, Tn−1 indicates a time offset between the slave device and the backup master device that is obtained by the slave device at the (n−1)th time.

Alternatively, the detection unit comprises:

a judging module, configured to: judge whether a clock grade of a clock source of the master device can be detected, or, judge whether the detected clock source of the master device is a clock source with the highest clock grade in all clock sources in a database;

a detection module, configured to: when the slave device cannot detect the clock grade of the clock source of the master device, or when determining that the detected clock source of the master device is not a clock source with the highest clock grade in all clock sources in the database, detect that time synchronization cannot be performed via a primary link between the master device and the slave device;

the synchronization unit comprises:

a third switching module, configured to: switch from the primary link to a backup link between the slave device and the backup master device corresponding to the clock source with the highest clock grade in the database;

a third synchronization module, configured to: use the backup link to perform the time synchronization with the backup master device.

In the embodiments of the present document, use of link backup and master device backup enables link switch in the event of abnormalities without affecting time synchronization, thus solving the technical problem of time synchronization failure caused by abnormalities in the related art, and achieving the technical effect of improving the reliability of time synchronization.

PREFERRED EMBODIMENTS OF THE DOCUMENT

Figure 1A:
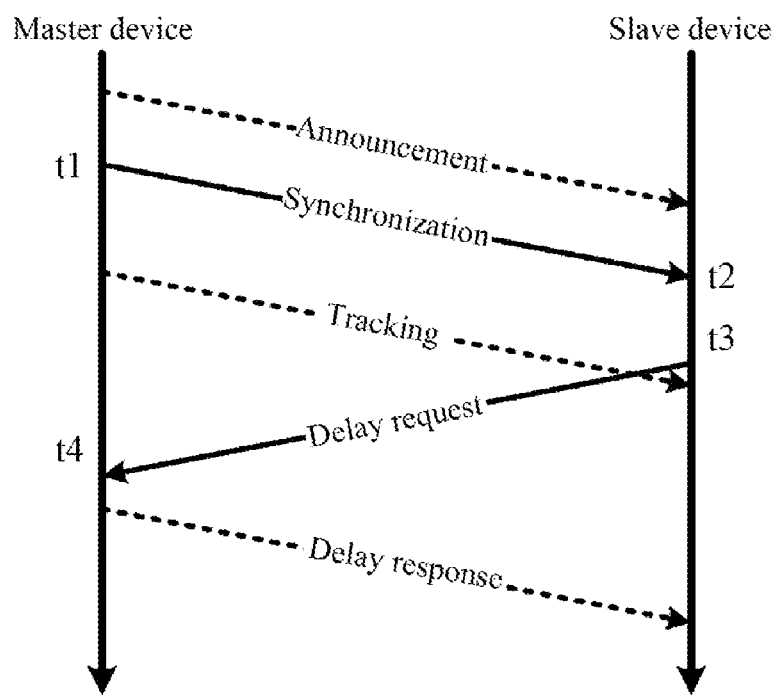
FIGS. 1(a) and (b) are flow charts of a group of IEEE 1588 V2 protocol packets as well as time synchronization in the related art.
Figure 1B:
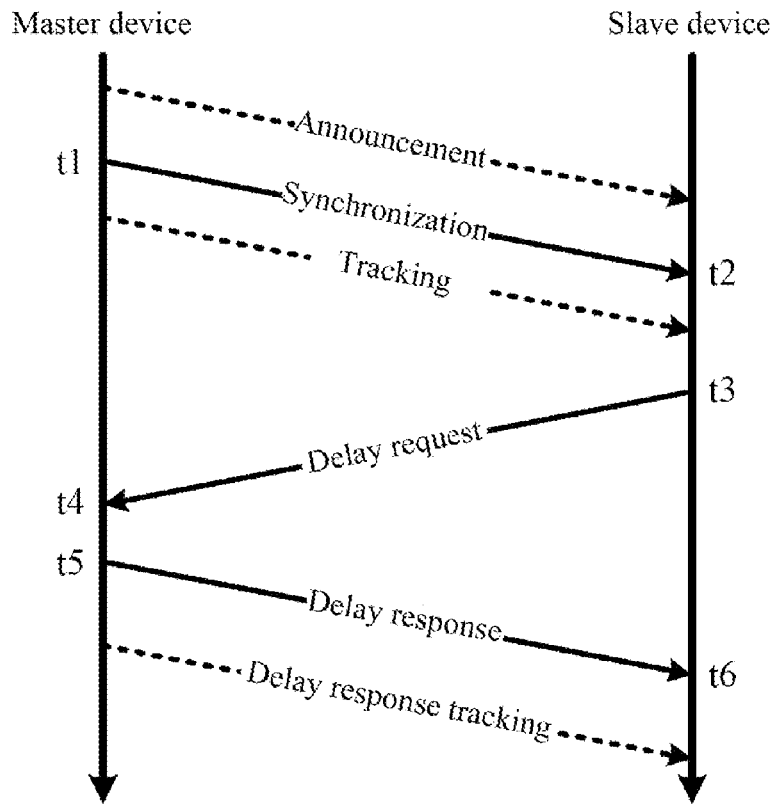

Hereinafter in conjunction with the accompanying drawings, the embodiments of the present document will be described in detail. It should be noted that, in the case of no conflict, embodiments and features in the embodiments of the present application might be combined with each other.

This specific embodiment is described only taking an external clock source being a GPS (Global Positioning System) device and an Ethernet ring being established based on the STP (Spanning Tree Protocol) as an example, and when the external clock source is another device such as the 1588 clock source, or when the Ethernet ring is established based on other Ethernet ring technology such as the ZESR, the case is the same for the method and device of the present document, and is not repeated.

The embodiments of the present document provide a time synchronization method implemented based on the IEEE 1588 V2 protocol, constructing a communication system capable of achieving precise time synchronization via an Ethernet data exchange network, to improve the reliability of time synchronization technology and the reliability of precise time synchronization of the communication system through the methods of backing up a link between a master device and a slave device, configuring a backup master device, and the slave device smoothly switching to the time synchronized master device and backup master device.

To this end, the embodiments of the present document provide a time synchronization method, and the method comprises the following steps.

In step S1, a slave device detects whether time synchronization can be performed via a primary link between a master device and the slave device.

In step S2, when time synchronization cannot be performed via the primary link between the master device and the slave device, the slave device uses a backup link to perform time synchronization.

In this embodiment of the present document, link backup and master device backup can be used to perform link switch under abnormal circumstances without affecting time synchronization, thus solving the technical problem of time synchronization failure caused by abnormalities in the related art, and achieving the technical effect of enhancing the reliability of time synchronization.

In order to achieve use of a backup link to perform time synchronization, the embodiments of the present document provide a variety of implementation schemes, comprising: 1) backing up a link between the master device and the slave device, which can avoid time synchronization failure caused by link abnormalities; 2) configuring a backup master device, since it is provided that the slave device smoothly switches to the time synchronized master device and backup master device, it can avoid time synchronization failure caused by a congestion or abnormal link, and in the present implementation scheme, since the backup master device is provided, it can also actively choose a time source with a relatively high clock grade to perform time synchronization, improving the reliability of time synchronization technology and the reliability of precise time synchronization of the communication system.

The above respective implementation schemes will be further described in the following.

1) It is to use a link backup between a master device and a slave device; use the Spanning Tree Protocol or Ethernet technology to create an Ethernet ring. In the Ethernet ring, there are at least two links between the master device and the slave device, and the slave device selects one primary link therefrom to interact protocol packets with the master device to achieve time synchronization. When the primary link is abnormal, the slave device selects another backup link to interact protocol packets with the master device to ensure uninterrupted time synchronization. Before and after switching, the master device is the same device and has a same clock source, and the time synchronization does not jitter.

2) It is to configure a backup master device in the networking, the slave device smoothly switches to the time synchronized master device and the backup master device; there exist one master device and at least one backup master device in the networking at the same time, they are devices with the same clock source and simultaneously establish physical connection with the slave device, the slave device selects a master device as the time synchronization source implemented based on the IEEE 1588 V2 protocol. When a congestion occurs in the slave device, or the link between the slave device and the master device is abnormal, or when the clock grade of the clock source of the master device deteriorates, or other abnormal conditions occur so that the slave device cannot be time synchronized with the master device, the slave device selects to interact protocol packets with another backup master device, so as to ensure uninterrupted time synchronization. Before and after switching, the master device and the backup master device are different devices but have a same clock source, to ensure that the time synchronization jitter range is relatively small.

After the aforementioned switching process, when the slave device calculates a time offset with the master device and corrects the time of the slave device, the time offsets of the slave device with the original master device and with the new master device before and after switching are compared, a difference of the two time offsets is calculated, and if the difference exceeds (or several times) the time offset between the slave device and the original master device, then the slave device only corrects half (or several times without exceeding one time) of the time offset between the slave device and the new master device when correcting the time, thus reducing the jitter of the time synchronization correction value of the slave device before and after switching.

Hereinafter in conjunction with the accompanying drawings, the above respective implementation schemes will be further described.

Figure 2:
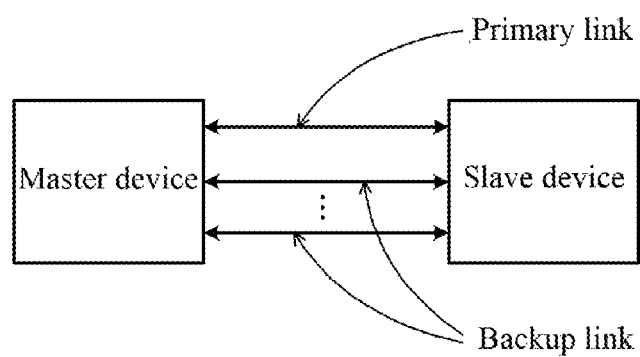
FIG. 2 is a schematic diagram of a scheme of backing up a link between the master device and the slave device in accordance with one embodiment of the present document.
Figure 3:
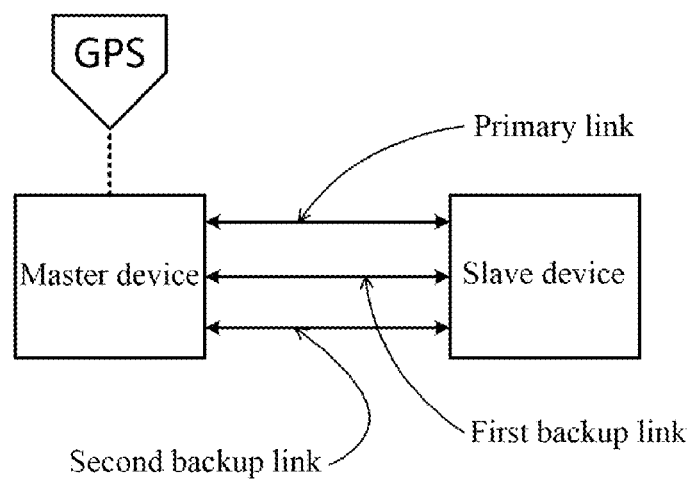
FIG. 3 is a preferred schematic diagram of a scheme of backing up a link between the master device and the slave device in accordance with one embodiment of the present document.

FIG. 2 is an outline diagram of a scheme of backing up a link between the master device and slave device in an implementation scheme of the present document. FIG. 3 is a schematic diagram of a preferred embodiment of the scheme of backing up a link between the master device and slave device in an implementation scheme of the present document.

In the system networking as shown in FIG. 3, there are three links between the master device and the slave device to implement link backup. Network management is performed based on the Spanning Tree Protocol (or other ring network protection technology), but it does not block the IEEE 1588 V2 protocol based packet interaction and time synchronization. Each of the three links achieves time synchronization between the slave device and the master device, the slave device designates one link as the primary link, and other links as backup links. The slave device selects the primary link to perform time synchronization with the master device, and saves the data of using the backup links to perform IEEE 1588 V2 protocol packet interaction and protocol calculation with the master device into a database.

When the primary link is abnormal, the slave device selects the first or second backup link as a new primary link according to the protocol calculation data stored in the database, to ensure uninterrupted time synchronization. The original master link and other backup link work as backup links after link recovery. The slave device selects the new primary link to perform time synchronization with the master device, and saves the data of using the backup links to perform the IEEE 1588 V2 protocol packet interaction and protocol calculation with the master device into the database. Before and after the link switch, the master device is the same device and has a same clock source, and the time synchronization does not jitter.

Figure 4:
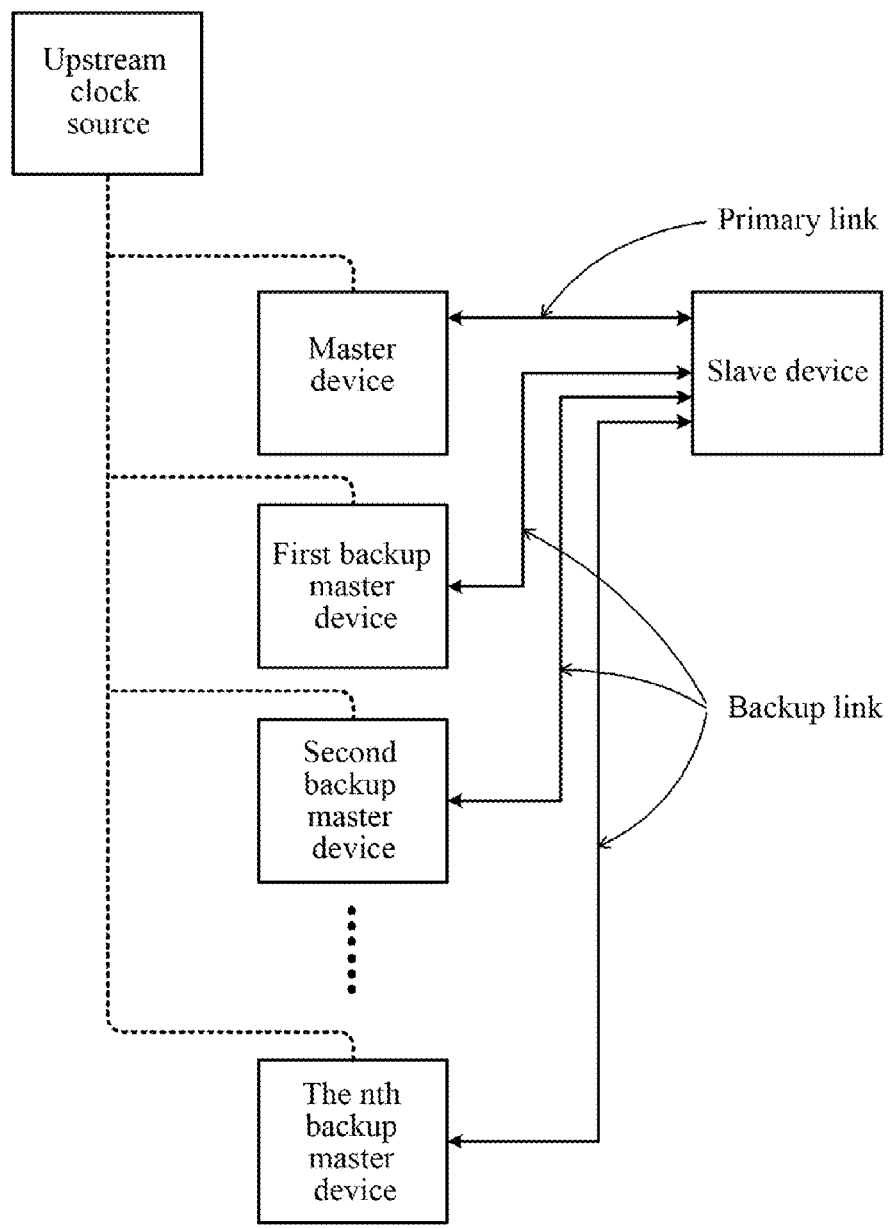
FIG. 4 is a schematic diagram of a scheme of configuring a backup master device in accordance with one embodiment of the present document.
Figure 5:
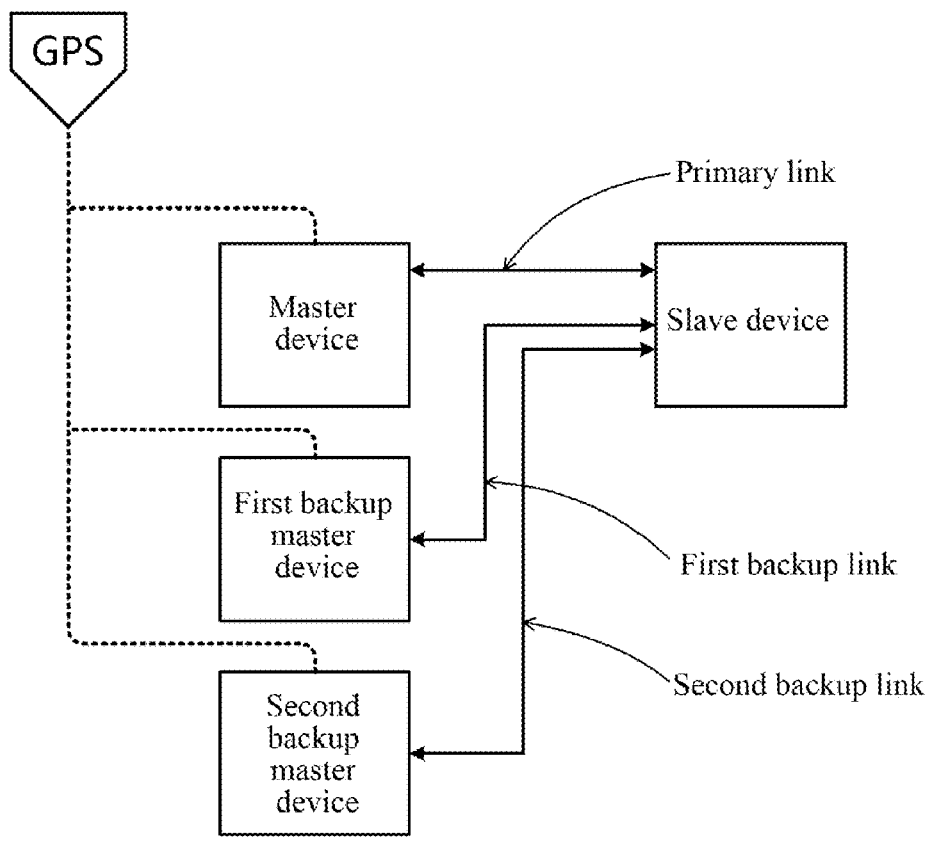
FIG. 5 is a preferred schematic diagram of the scheme of configuring a backup master device in accordance with one embodiment of the present document.

FIG. 4 is an outline diagram of the scheme of configuring a backup master device in the implementation scheme of the present document. FIG. 5 is a schematic diagram of a preferred embodiment of the scheme of configuring a backup master device in the implementation scheme of the present document.

In the system networking as shown in FIG. 5, one master device and two backup master devices are configured. They all take the GPS as an upstream clock source to achieve clock synchronization, and are with the same clock source, and establish physical connection with the slave device at the same time. The physical link connecting the slave device with the master device is a primary link, and the physical link connecting the slave device with the first backup master device is a first backup link, and the physical link connecting the slave device with the second backup master device is a second backup link.

Under normal circumstances, each link between the slave device and the master device as well as the backup master devices achieves the IEEE 1588 V2 protocol packet interaction and protocol calculation, and the slave device designates a link connected to the master device as a primary link while other links as backup links. The slave device selects the primary link to perform time synchronization with the master device, and saves the data of using the backup links to perform IEEE 1588 V2 protocol packet interaction and protocol calculation with the backup master devices into a database.

Table 1 is a list of reasons for the slave device switching links.

TABLE 1

| Number | Type | Description of Reason |
|---|---|---|
| 1 | Failure | The port connecting the slave device with the primary link congests |
| 2 | Failure | The link between the slave device and the master device is abnormal |
| 3 | Failure | Other reasons causing that the slave device cannot be synchronized with the master device |
| 4 | State change | The clock grade of the clock source of the master device deteriorates to be lower than the clock grade of the clock source of the backup master device |

When a failure numbered as 1, 2 or 3 in the abnormal conditions described in Table 1 occurs, the slave device selects the first or second backup link as a new primary link according to the protocol calculation data stored in the database to ensure uninterrupted time synchronization. The original primary link and the other backup link work as backup links after link recovery. As a new primary link is used, the backup master device connected with the slave device is taken as a new master device, and the original master device and the other backup master device work as backup master devices after link recovery. The slave device selects a new primary link to perform time synchronization with a new master device, and saves the data of using the backup link to perform IEEE 1588 V2 protocol packet interaction and protocol calculation with the backup master device into the database.

Before and after the link switch, the master device is switched, and since both the original master device and the new master device take the GPS as an upstream clock source to implement clock synchronization, and they are devices with the same clock source, the time synchronization jitter range is relatively small.

In accordance with the IEEE 1588 V2 protocol, the slave device receives Announce messages from the master device, the first backup master device and the second backup master device via three links, and parses the grandmasterClock-Quality domain therefrom, namely the clock grades of the clock sources of the master device, the first backup master device and the second backup master device. The slave device obtains a clock grade parameter from a plurality of time synchronization sources and records it in the database.

Figure 6:
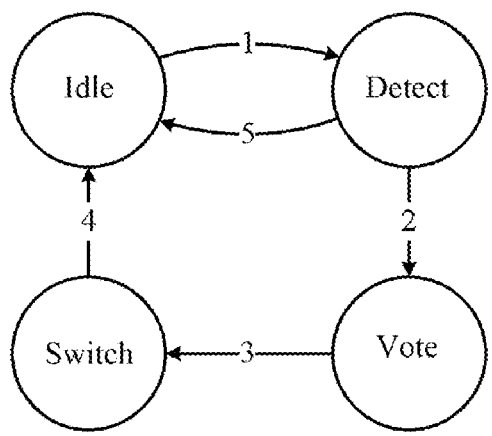
FIG. 6 is a schematic diagram of the state of the smooth switching scheme in accordance with one embodiment of the present document.

FIG. 6 is a schematic diagram of the state of the smooth switching scheme in the implementation scheme of the present document, and as shown in FIG. 6, the smooth switching scheme comprises the following state change paths:

1) when the slave device cannot detect the clock grade of the master device or detects that the clock grade of the master device is not the highest grade of the clock grades of all clock sources in the database for the first time, the Idle state is switched to the Detect state;

2) when the slave device, in several time periods, continuously cannot detect the clock grade of the master device or detects that the clock grade of the master device is not the highest grade of the clock grades in all clock sources in the database, the Detect state is switched to the Vote state;

3) after the slave device elects a clock source device with the highest grade according to the clock grades of all clock sources in the database as a new master device, the Vote state is switched to the Switch state;

4) after the slave device performs IEEE 1588 V2 protocol packet interaction with the new master device and achieves time synchronization, the states of the master device and the backup master device of the clock source device in the database are updated, and the Switch state is switched to the Idle state;

5) when the slave device detects that the clock grade of the master device is the highest grade of the clock grades of all clock sources in the database, the Detect state is switched back to the Idle state.

When the state change numbered as 4 in the abnormal conditions shown in Table 1 occurs, the slave device performs state change as shown in FIG. 6.

Figure 7:
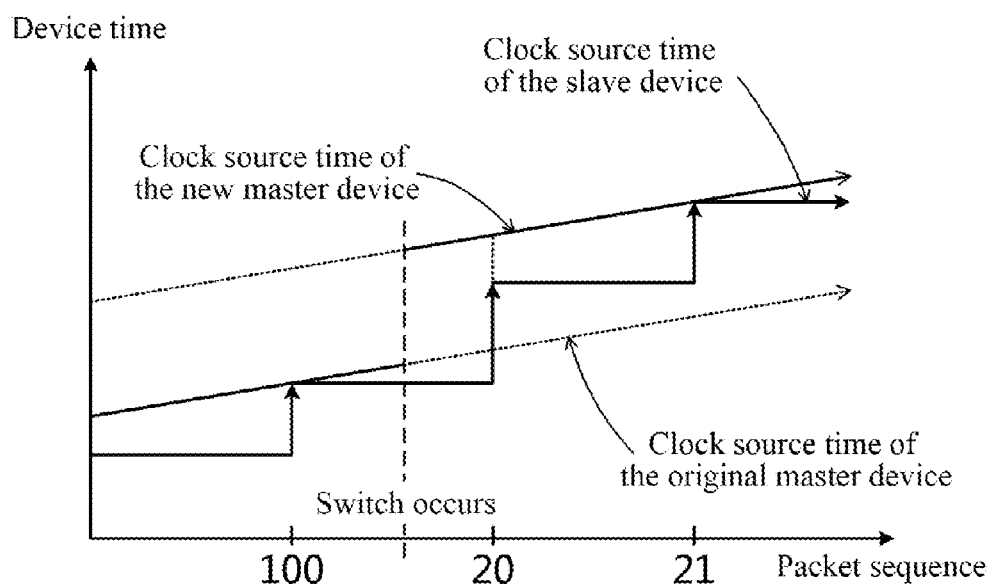
FIG. 7 is a preferred graph of the slave device correcting time in the smooth switching scheme in accordance with one embodiment of the present document.

FIG. 7 is a preferred graph of the slave device correcting time in the smooth switching scheme of the implementation scheme of the present document. In the networking of the implementation scheme shown in FIG. 5, when the state change path 4 shown in FIG. 6 occurs, as shown in FIG. 7, 1) the slave device performs time synchronization with the original master device, and calculates the time offset as T1 according to a group of IEEE 1588 V2 protocol packets with the packet sequence number being 100, the slave device corrects the time offset, and the corrected time offset is T1;

2) after detecting that the time source is switched from the master device to the backup master device, the slave device performs IEEE 1588 V2 protocol packet interaction with the new master device, performs time synchronization, and calculates the time offset as T2 according to a group of IEEE 1588 V2 protocol packets with the packet sequence number being 20;

3) since the new master device and the original master device are different devices, T2 may be larger as compared to T1. If the difference $\Delta T=T2-T1>k \cdot T1$ ($0<k \leq 1$), the slave device corrects the time offset, and the corrected time offset is $T2=k \cdot T1$ ($0<k \leq 1$), so as to reduce the jitter of the time synchronization correction value of the slave device before and after switching. The left-over time error is corrected according to the time offset T3 calculated from a group of IEEE 1588 V2 protocol packets with the packet sequence number being 21;

4) similarly, if the difference between the time offset Tm calculated from a group of IEEE 1588 V2 protocol packets and the last time offset Tm−1 is $\Delta T=Tm-Tm-1>k \cdot Tm-1$ ($0<k \leq 1$), the slave device corrects the time offset Tm, and the corrected time offset $Tm=k \cdot Tm-1$ ($0<k \leq 1$), the left-over time error is corrected according to the time offset Tm+1 calculated from the next group of IEEE 1588 V2 protocol packets;

5) when the difference between the time offset Tn calculated out from a certain group of IEEE 1588 V2 protocol packets and the last time offset Tn−1 is $\Delta T=Tn-Tn-1 \leq k \cdot Tn-1$ ($0<k \leq 1$), it is to stop correcting the time offset Tn of the slave device, so as to achieve time synchronization between the slave device and the new master device;

6) since both the original master device and the new master device take the GPS as an upstream clock source to achieve clock synchronization, and they are devices with the same clock source, the values of the time offsets Tm and Tm−1 between the slave device and the master device that are calculated by the slave device before and after switching are usually within the sub-microsecond and even nanosecond-level time precision and range, and if the absolute value of the time offset Tm calculated from a certain group of IEEE 1588 V2 protocol packets is less than a certain time range allowed by the precision, then the time of the slave device is corrected according to Tm to achieve time synchronization between the slave device and the new master device, and there is no time error left.

Figure 8:
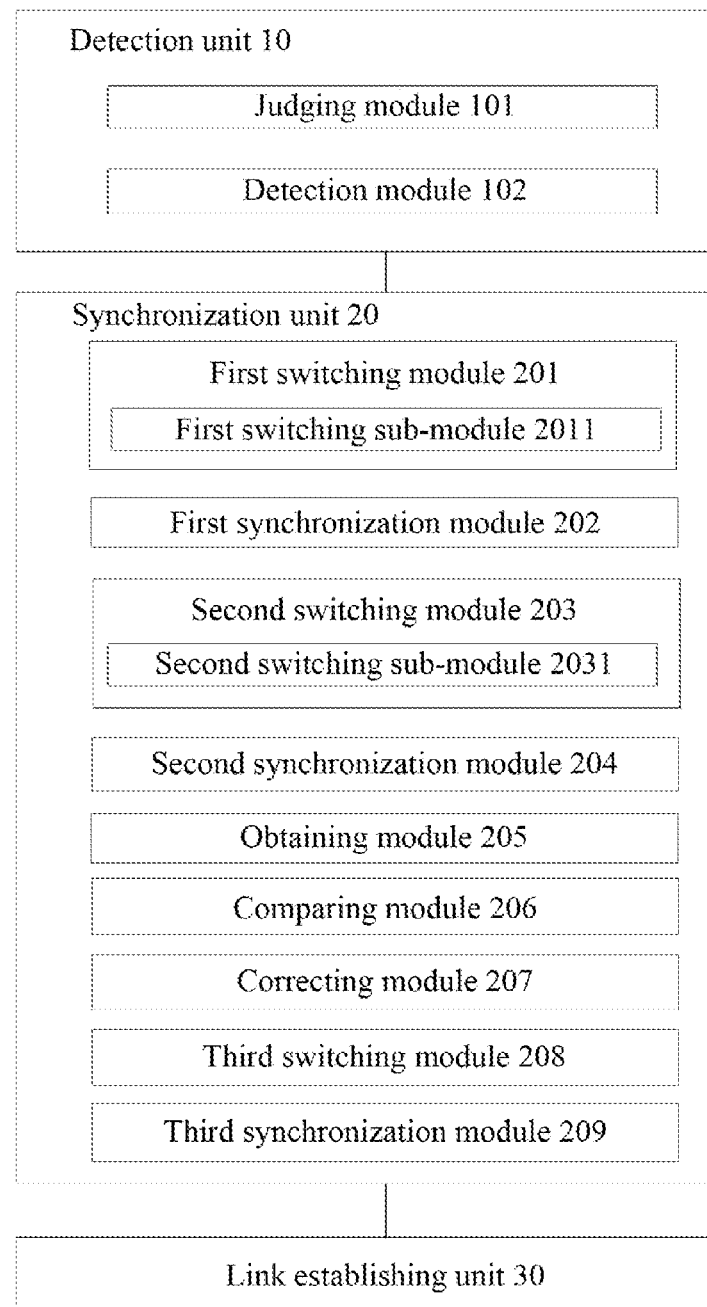
FIG. 8 is a block diagram of a time synchronization device in accordance with one embodiment of the present document.

As shown in FIG. 8, the present embodiment further provides a time synchronization device located in the slave device and the device is used for achieving the abovementioned embodiments and preferred embodiments, and the contents which have been described will not be repeated. The term "unit" or "module" used hereinafter can be a software and/or hardware combination achieving a predetermined function. Although the device described in the following embodiment is preferably implemented by software, it may also be conceived to implement it by hardware, or a combination of software and hardware.

In the present embodiment, the time synchronization device comprises: a detection unit 10, configured to: detect whether time synchronization can be performed via a primary link between a master device and the slave device; a synchronization unit 20, configured to: when time synchronization cannot be performed via the primary link between the master device and the slave device, use a backup link to perform time synchronization. In the embodiments of the present document, link backup and master device backup can be used to perform link switch under abnormal circumstances without affecting time synchronization, thus solving the technical problem of time synchronization failure caused by abnormalities in the related art, and achieving the technical effect of enhancing the reliability of time synchronization.

In order to achieve use of a backup link to perform time synchronization, the embodiments of the present document provide a variety of implementation schemes, comprising: 1) backing up a link between a master device and a slave device, which can avoid time synchronization failure caused by link abnormalities; 2) configuring a backup master device, since it is provided that the slave device smoothly switches to the time synchronized master device and backup master device, it can avoid time synchronization failure caused by a congestion or abnormal link, and in the present implementation scheme, since the backup master device is provided, it can also actively choose a time source with a higher clock grade to perform time synchronization, improving the reliability of time synchronization technology and the reliability of precise time synchronization of the communication system.

Hereinafter, the above respective implementation schemes will be further described.

1) Backing Up a Link Between a Master Device and a Slave Device

The synchronization unit 20 comprises: a first switching module 201, configured to: switch from the primary link to the backup link between the master device and the slave device, wherein, the master device before and after switching is the same device and has a same clock source used for the time synchronization; a first synchronization module 202, configured to: use the backup link to perform the time synchronization with the master device.

The first switching module 201 comprises: a first switching sub-module 2011, configured to: switch from the primary link to one said backup link between the master device and the slave device, wherein the slave device establishes at least two said backup links with the master device in advance.

2) Configuring a Backup Master Device the synchronization unit 20 further comprises: a second switching module 203, configured to: switch from the primary link to the backup link between the backup master device and the slave device, wherein the master device and the backup master device are different devices but have a same clock source for the time synchronization; a second synchronization module 204, configured to: use the backup link to perform the time synchronization with the backup master device.

The abovementioned time synchronization device further comprises: a link establishing unit 30, configured to: before the detection unit detects whether time synchronization can be performed via a primary link between a master device and the slave device, establish physical connection with the master device and the backup master device at the same time to respectively obtain the primary link and the backup link.

The second switching module 203 comprises: a second switching sub-module 2031, configured to: switch from the primary link to the backup link between the slave device and one said backup master device, wherein the slave device respectively establishes one said backup link with each of at least two said backup master devices in advance.

The synchronization unit 20 further comprises: an obtaining module 205, configured to: interact protocol packets with the backup master device to obtain the time offset T2 between the slave device and the backup master device; a comparing module 206, configured to: compare the time offset T2 with the previously obtained time offset T1 between the slave device and the master device; a correcting module 207, configured to: when the difference $\Delta T = T2-T1 > k \cdot T1$ ($0 < k \leq 1$), correct the time offset T2, wherein, the corrected time offset is $T2 = k \cdot T1$.

The correcting module is further configured to: after correcting the time offset T2, obtain a time offset between the slave device and the backup master device at every predetermined time interval, when $\Delta T = Tn - Tn-1 > k \cdot Tn-1$, correct Tn to $Tn = k \cdot Tn-1$ ($0 < k \leq 1$), when $\Delta T = Tn - Tn-1 \leq k \cdot Tn-1$, stop correcting the time offset, wherein, Tn represents a time offset between the slave device and the backup master device that is obtained by the slave device at the nth time, Tn−1 represents a time offset between the slave device and the backup master device that is obtained by the slave device at the (n−1)-th time.

The detection unit 10 further comprises: a judging module 101, configured to: judge whether a clock grade of a clock source of the master device can be detected, or, judge whether the detected clock source of the master device is a clock source with the highest clock grade in all clock sources in a database; a detection module 102, configured to: when the slave device cannot detect the clock grade of the clock source of the master device, or when determining that the detected clock source of the master device is not a clock source with the highest clock grade in all clock sources in the database, detect that time synchronization cannot be performed via a primary link between the master device and the slave device.

On this basis, the synchronization unit 20 further comprises: a third switching module 208, configured to: switch from the primary link to the backup link between the slave device and the backup master device corresponding to the clock source with the highest clock grade in the database; a third synchronization module 209, configured to: use the backup link to perform the time synchronization with the backup master device.

Obviously, a person skilled in the art should understand that the respective modules or steps of the present document can be implemented with general computing devices, they can be concentrated on a single computing device or distributed in a network consisting of multiple computing devices, and alternatively, they may be executed by program codes executable by computing devices, so that they can be stored in storage means and executed by computing devices, and in some cases, the illustrated or described steps can be performed in a different order, or they can be made into integrated circuit modules, or some of the modules or steps therein can be made into a single integrated circuit module to implement. Therefore, the present document is not limited to any specific hardware and software combination.

The above description is only preferred embodiments of the present document, and it is not used to limit the present document, and for those skilled in the art, the embodiments of the present document may have various modifications and variations. Any modifications, equivalents and improvements made within the spirit and principle of the present document should be included in the protection scope of the present document.

INDUSTRIAL APPLICABILITY

In the embodiments of the present document, link backup and master device backup can be used to enable link switch in the event of abnormalities without affecting time synchronization, thus solving the technical problem of time synchronization failure caused by abnormalities in the related art, and achieving the technical effect of improving the reliability of time synchronization.

What is claimed is:
1. A time synchronization method, comprising:
a slave device detecting whether time synchronization can be performed via a primary link between a master device and the slave device;
when the time synchronization cannot be performed via the primary link between the master device and the slave device, the slave device using a backup link to perform the time synchronization;
wherein the step of the slave device detecting whether time synchronization can be performed via a primary link between a master device and the slave device comprises:
the slave device detecting whether a clock source of the master device is a clock source with a highest clock grade in all clock sources in a database;
when the slave device detects that the clock source of the master device is not the clock source with the highest clock grade in all clock sources in the database, the slave device skipping performing the time synchronization via the primary link between the master device and the slave device;
when the slave device detects that the clock source of the master device is the clock source with the highest clock grade in all clock sources in the database, switching the slave device from a detect state back to an idle state;
the step of the slave device using a backup link to perform time synchronization comprises:
the slave device switching from the primary link to a backup link between a backup master device and the slave device, and the slave device interacting protocol packets with the backup master device to obtain a time offset T2 between the slave device and the backup master device;
the slave device comparing the time offset T2 with a previously obtained time offset T1 between the slave device and the master device;
when a difference $\Delta T = T2-T1 > k \cdot T1$ ($0 < k \leq 1$), the slave device corrects the time offset T2, wherein a corrected time offset is $T2 = k \cdot T1$.

2. The method of claim 1, wherein, the step of the slave device using a backup link to perform the time synchronization comprises:
the slave device switching from the primary link to a backup link between the master device and the slave device, wherein the master device before and after switching is a same one device and has a same clock source for the time synchronization;
the slave device using the backup link to perform the time synchronization with the master device.

3. The method of claim 2, wherein, the step of the slave device switching from the primary link to the backup link between the master device and the slave device comprises:
the slave device switching from the primary link to one said backup link between the master device and the slave device, wherein the slave device establishes one said primary link and at least one said backup link with the master device in advance.

4. The method of claim 1, wherein, the step of the slave device using a backup link to perform the time synchronization comprises:
the slave device using the backup link to perform the time synchronization with the backup master device, wherein the master device and the backup master device are not the same device but have a same clock source used for the time synchronization.

5. The method of claim 4, wherein, before the step of the slave device detecting whether time synchronization can be performed via a primary link between a master device and the slave device, the method further comprises:
the slave device establishing physical connection with the master device and the backup master device simultaneously to respectively obtain the primary link and the backup link.

6. The method of claim 4, wherein, the step of the slave device switching from the primary link to the backup link between the backup master device and the slave device comprises:
the slave device switching from the primary link to the backup link between the slave device and one said backup master device, wherein the slave device establishes one said primary link with the master device in advance, and establishes at least one said backup link with at least one said backup master device.

7. The method of claim 4, wherein,
the step of the slave device using a backup link to perform time synchronization comprises:
the slave device switching from the primary link to a backup link between the slave device and the backup master device corresponding to the clock source with the highest clock grade in the database;
the slave device using the backup link to perform the time synchronization with the backup master device.

8. The method of claim 1, wherein, after the step of the slave device correcting the time offset T2, the method further comprises:
the salve device obtaining a time offset between the slave device and the backup master device at every predetermined time interval, when $\Delta T = T_n - T_{n-1} > k \cdot T_{n-1}$, correcting $T_n$ to $T_n = k \cdot T_{n-1}$ ($0 < k \leq 1$), and when $\Delta T = T_n - T_{n-1} \leq k \cdot T_{n-1}$ ($0 < k \leq 1$), stopping correcting the time offset, wherein, $T_n$ indicates a time offset between the slave device and the backup master device that is obtained by the salve device at a nth time, $T_{n-1}$ indicates a time offset between the slave device and the backup master device that is obtained by the slave device at a (n−1)th time.

9. A time synchronization device, located in a slave device, comprising:
a detection unit, configured to: detect whether time synchronization can be performed via a primary link between a master device and the slave device;
a synchronization unit, configured to: when the time synchronization cannot be performed via the primary link between the master device and the slave device, use a backup link to perform the time synchronization;
wherein the detection unit comprises:
a judging module, configured to: detecting whether a clock source of the master device is a clock source with a highest clock grade in all clock sources in a database;
a detection module, configured to: when the slave device detects that the clock source of the master device is not the clock source with the highest clock grade in all clock sources in the database, skip performing the time synchronization via the primary link between the master device and the slave device; wherein the detection module is further configured to: when the slave device detects that the clock source of the master device is the clock source with the highest clock grade in all clock sources in the database, switch the slave device from a detect state back to an idle state;
wherein the synchronization unit further comprises:
a second switching module, configured to: switch from the primary link to a backup link between a backup master device and the slave device,
an obtaining module, configured to: interact protocol packets with the backup master device to obtain a time offset T2 between the slave device and the backup master device;
a comparing module, configured to: compare the time offset T2 with a previously obtained time offset T1 between the slave device and the backup master device; and
a correcting module, configured to: when a difference $\Delta T = T2 - T1 > k \cdot T1$ ($0 < k \leq 1$), correct the time offset T2, wherein, the corrected time offset is $T2 = k \cdot T1$.

10. The device of claim 9, wherein, the synchronization unit comprises:
a first switching module, configured to: switch from the primary link to a backup link between the master device and the slave device, wherein, the master device before and after switching is a same one device and has a same clock source used for the time synchronization;
a first synchronization module, configured to: use the backup link to perform the time synchronization with the master device.

11. The device of claim 10, wherein, the first switching module comprises:
a first switching sub-module, configured to: switch from the primary link to one said backup link between the master device and the slave device, wherein the slave device establishes one said primary link and at least one said backup link with the master device in advance.

12. The device of claim 9, wherein, the synchronization unit further comprises:
a second synchronization module, configured to: use the backup link to perform the time synchronization with the backup master device; wherein the master device and the backup master device are different devices but have a same clock source for the time synchronization.

13. The device of claim 12, further comprising:
a link establishing unit, configured to: before the detection unit detecting whether time synchronization can be performed via a primary link between the master device and the slave device, establish physical connection with the master device and the backup master device simultaneously to respectively obtain the primary link and the backup link.

14. The device of claim 12, wherein, the second switching module comprises:
a second switching sub-module, configured to: switch from the primary link to the backup link between the slave device and one said backup master device, wherein the slave device establishes one said primary link with the master device in advance, and establishes at least one said backup link with at least one said backup master device.

15. The device of claim 12, wherein,
the synchronization unit comprises:
a third switching module, configured to: switch from the primary link to a backup link between the slave device and the backup master device corresponding to the clock source with the highest clock grade in the database;
a third synchronization module, configured to: use the backup link to perform the time synchronization with the backup master device.

16. The device of claim 9, wherein, the correcting module is further configured to: after correcting the time offset T2, obtain a time offset between the slave device and the backup master device at every predetermined time interval, when $\Delta T = T_n - T_{n-1} > k \cdot T_{n-1}$, correct $T_n$ to $T_n = k \cdot T_{n-1}$ ($0 < k \le 1$), when $\Delta T = T_n - T_{n-1} < k \cdot T_{n-1}$, stop correcting the time offset, wherein, $T_n$ indicates a time offset between the slave device and the backup master device that is obtained by the slave device at a nth time, $T_{n-1}$ indicates a time offset between the slave device and the backup master device that is obtained by the slave device at a (n−1)th time.

* * * * *